United States Patent
Rao et al.

(10) Patent No.: US 6,498,972 B1
(45) Date of Patent: Dec. 24, 2002

(54) METHOD FOR OPERATING A PRE-CRASH SENSING SYSTEM IN A VEHICLE HAVING A COUNTERMEASURE SYSTEM

(75) Inventors: Manoharprasad K. Rao, Novi, MI (US); Kwaku O. Prakah-Asante, Commerce Township, MI (US); Gary Steven Strumolo, Beverly Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,774

(22) Filed: Feb. 13, 2002

(51) Int. Cl.[7] ................................................. B60Q 1/00
(52) U.S. Cl. ........................................ 701/45; 701/301
(58) Field of Search ................... 701/45, 301; 280/734, 280/735; 180/170, 179, 232; 340/441

(56) References Cited

U.S. PATENT DOCUMENTS

| | | |
|---|---|---|
| 3,514,610 A | 5/1970 | Huston et al. |
| 4,257,703 A | 3/1981 | Goodrich |
| 4,381,829 A | 5/1983 | Montaron |
| 4,623,966 A | 11/1986 | O'Sullivan |
| 4,638,289 A | 1/1987 | Zottnik |
| 4,673,937 A | 6/1987 | Davis |
| 4,679,838 A * | 7/1987 | Mikina ........................ 188/130 |
| 4,833,469 A | 5/1989 | David |
| 4,916,450 A | 4/1990 | Davis |
| 4,969,103 A | 11/1990 | Maekawa |
| 4,992,943 A | 2/1991 | McCracken |
| 4,994,972 A | 2/1991 | Diller |
| 5,014,810 A * | 5/1991 | Mattes et al. ................ 180/268 |
| 5,040,118 A | 8/1991 | Diller |
| 5,063,603 A | 11/1991 | Burt |
| 5,091,726 A | 2/1992 | Shyu |
| 5,162,794 A | 11/1992 | Seith |

(List continued on next page.)

FOREIGN PATENT DOCUMENTS

| | | |
|---|---|---|
| JP | 54-65934 A | 5/1979 |
| WO | 98/37435 | 8/1998 |
| WO | 98/58274 | 12/1998 |

*Primary Examiner*—William A. Cuchlinski, Jr.
*Assistant Examiner*—Olga Hernandez
(74) *Attorney, Agent, or Firm*—Frank A. MacKenzie

(57) ABSTRACT

A control system (10) for an automotive vehicle (50) has a remote object sensor (18) that generates an object signal in the presence of an object. A vehicle trajectory sensor (34) generates a signal indicative of the vehicle traveling on a curved road. A vehicle speed sensor (32) generates a speed signal corresponding to the longitudinal speed of the vehicle. A controller (12) is coupled to the object sensor (18), the vehicle trajectory sensor, and the vehicle speed sensor. When the remote object sensor (18) indicates the presence of an object with a minimum cross section in a pre-defined decision zone meeting pre-defined relative velocity criteria, and when the vehicle speed is above a first threshold and below a second threshold, and when said vehicle trajectory signal indicates the vehicle traveling on a curved road with a radius of curvature above a threshold value, a vehicle safety countermeasure system (40) is deployed.

20 Claims, 5 Drawing Sheets

U.S. PATENT DOCUMENTS

| | | | | |
|---|---|---|---|---|
| 5,166,881 A | | 11/1992 | Akasu | |
| 5,173,859 A | | 12/1992 | Deering | |
| 5,182,459 A | | 1/1993 | Okano et al. | |
| 5,230,400 A | | 7/1993 | Kakinami et al. | |
| 5,234,071 A | | 8/1993 | Kajiwara | |
| 5,249,157 A | | 9/1993 | Taylor | |
| 5,307,136 A | | 4/1994 | Saniyoshi | |
| 5,314,037 A | | 5/1994 | Shaw et al. | |
| 5,430,432 A | | 7/1995 | Camhi et al. | |
| 5,467,283 A | | 11/1995 | Butsuen et al. | |
| 5,479,173 A | | 12/1995 | Yoshioka et al. | |
| 5,502,432 A | | 3/1996 | Ohmayusa et al. | |
| 5,521,580 A | | 5/1996 | Kaneko et al. | |
| 5,521,822 A | * | 5/1996 | Wang | 180/282 |
| 5,526,269 A | | 6/1996 | Ishibashi et al. | |
| 5,534,870 A | | 7/1996 | Avignon et al. | |
| 5,541,590 A | | 7/1996 | Nishio | |
| 5,552,986 A | | 9/1996 | Omura et al. | |
| 5,572,428 A | | 11/1996 | Ishida et al. | |
| 5,574,463 A | | 11/1996 | Shirai et al. | |
| 5,594,414 A | | 1/1997 | Namngani | |
| 5,602,760 A | | 2/1997 | Chacon et al. | |
| 5,604,683 A | | 2/1997 | Roecker | |
| 5,629,847 A | * | 5/1997 | Shirakawa et al. | 180/282 |
| 5,635,922 A | | 6/1997 | Cho et al. | |
| 5,646,612 A | | 7/1997 | Byon | |
| 5,680,097 A | | 10/1997 | Uemura et al. | |
| 5,684,474 A | | 11/1997 | Gilon et al. | |
| 5,689,264 A | | 11/1997 | Ishikawa et al. | |
| 5,699,040 A | | 12/1997 | Matsuda | |
| 5,699,057 A | | 12/1997 | Ikeda et al. | |
| 5,710,565 A | | 1/1998 | Shirai et al. | |
| 5,742,507 A | * | 4/1998 | Eckert | 180/197 |
| 5,745,870 A | | 4/1998 | Yamamoto et al. | |
| 5,748,477 A | | 5/1998 | Katoh | |
| 5,749,426 A | | 5/1998 | Gilling | |
| 5,751,211 A | | 5/1998 | Shirai et al. | |
| 5,751,836 A | | 5/1998 | Wildes et al. | |
| 5,754,099 A | * | 5/1998 | Nishimura et al. | 340/435 |
| 5,771,481 A | | 6/1998 | Gilling | |
| 5,779,264 A | | 7/1998 | Demesseman et al. | |
| 5,808,561 A | | 9/1998 | Kinoshita et al. | |
| 5,815,093 A | | 9/1998 | Kikinis | |
| 5,835,007 A | | 11/1998 | Kosiak | |
| 5,835,873 A | | 11/1998 | Darby et al. | |
| 5,838,228 A | | 11/1998 | Clark | |
| 5,847,472 A | | 12/1998 | Byon | |
| 5,847,755 A | | 12/1998 | Wixson et al. | |
| 5,872,536 A | | 2/1999 | Lyons et al. | |
| 5,905,457 A | | 5/1999 | Rashid | |
| 5,906,393 A | | 5/1999 | Mazur et al. | |
| 5,920,345 A | | 7/1999 | Sauer | |
| 5,926,126 A | | 7/1999 | Engelman | |
| 5,936,549 A | | 8/1999 | Tsuchiya | |
| 5,938,714 A | | 8/1999 | Satonka | |
| 5,948,026 A | * | 9/1999 | Beemer et al. | 701/115 |
| 5,949,366 A | | 9/1999 | Herrman | |
| 5,949,918 A | | 9/1999 | McCaffrey | |
| 5,955,967 A | | 9/1999 | Yamada | |
| 5,959,552 A | | 9/1999 | Cho | |
| 5,963,272 A | | 10/1999 | Wixson | |
| 5,964,822 A | | 10/1999 | Alland et al. | |
| 5,983,161 A | | 11/1999 | Lemelson et al. | |
| 5,995,037 A | | 11/1999 | Matsuda et al. | |
| 5,999,117 A | | 12/1999 | Engel | |
| 5,999,874 A | | 12/1999 | Winner et al. | |
| 6,002,983 A | | 12/1999 | Alland et al. | |
| 6,018,308 A | * | 1/2000 | Shirai | 342/118 |
| 6,025,797 A | | 2/2000 | Kawai et al. | |
| 6,026,340 A | | 2/2000 | Corrado et al. | |
| 6,031,484 A | | 2/2000 | Bullinger et al. | |
| 6,037,860 A | | 3/2000 | Zander et al. | |
| 6,044,166 A | | 3/2000 | Bassman et al. | |
| 6,044,321 A | | 3/2000 | Nakamura et al. | |
| 6,049,619 A | | 4/2000 | Anandan et al. | |
| 6,061,105 A | | 5/2000 | Sugimoto | |
| 6,076,028 A | | 6/2000 | Donnelly et al. | |
| 6,084,508 A | | 7/2000 | Mai et al. | |
| 6,085,151 A | | 7/2000 | Farmer et al. | |
| 6,087,928 A | | 7/2000 | Kleinberg et al. | |
| 6,088,639 A | | 7/2000 | Fayyad et al. | |
| 6,094,159 A | | 7/2000 | Oterfeld et al. | |
| 6,097,332 A | | 8/2000 | Crosby, II | |
| 6,114,951 A | | 9/2000 | Knioshita et al. | |
| 6,121,896 A | | 9/2000 | Rahman | |
| 6,148,943 A | | 11/2000 | Kodaka et al. | |
| 6,151,539 A | | 11/2000 | Bergholz et al. | |
| 6,157,892 A | | 12/2000 | Hada et al. | |
| 6,161,074 A | | 12/2000 | Sielagoski et al. | |
| 6,168,198 B1 | | 1/2001 | Breed et al. | |
| 6,169,479 B1 | | 1/2001 | Boran et al. | |
| 6,177,866 B1 | | 1/2001 | O'Connell | |
| 6,185,490 B1 | | 2/2001 | Ferguson | |
| 6,186,539 B1 | | 2/2001 | Foo et al. | |
| 6,188,316 B1 | | 2/2001 | Matsuno et al. | |
| 6,191,704 B1 | | 2/2001 | Takenaga et al. | |
| 6,204,756 B1 | | 3/2001 | Senyk et al. | |
| 6,209,909 B1 | | 4/2001 | Breed | |
| 6,218,960 B1 | | 4/2001 | Ishikawa et al. | |
| 6,219,606 B1 | | 4/2001 | Wessels et al. | |
| 6,223,125 B1 | | 4/2001 | Hall | |
| 6,225,918 B1 | | 5/2001 | Kam | |
| 6,226,389 B1 | | 5/2001 | Lemelson et al. | |
| 6,229,438 B1 | | 5/2001 | Kutlucinar et al. | |
| 6,246,961 B1 | | 6/2001 | Sasaki et al. | |
| 6,249,738 B1 | | 6/2001 | Higashimata et al. | |
| 6,256,584 B1 | | 7/2001 | Kodaka et al. | |
| 6,259,992 B1 | | 7/2001 | Urai et al. | |
| 6,317,693 B2 | * | 11/2001 | Kodaka et al. | 340/435 |
| 6,363,306 B1 | * | 3/2002 | Palmertz et al. | 280/728.1 |

* cited by examiner

METHOD FOR OPERATING A PRE-CRASH SENSING SYSTEM IN A VEHICLE HAVING A COUNTERMEASURE SYSTEM

CROSS REFERENCE TO RELATED APPLICATIONS

The present invention is related to U.S. Applications (Attorney Docket No. 201-0633/FGT-1534PA) entitled "Method For Operating A Pre-Crash Sensing System In A Vehicle Having A Countermeasure System Using A Radar And Camera" and (Attorney Docket No. 201-0634/FGT-1536PA) entitled "Method For Operating A Pre-Crash Sensing System In A Vehicle Having A Countermeasure System Using Stereo Cameras" filed simultaneously herewith and hereby incorporated by reference.

BACKGROUND OF INVENTION

1. Technical Field

The present invention relates to pre-crash sensing systems for automotive vehicles, and more particularly, to pre-crash sensing systems for enabling and disabling vehicle safety countermeasures operated in response to pre-crash detected imminent crash.

2. Background

Auto manufacturers are investigating radar, lidar, and vision-based pre-crash sensing systems to improve occupant safety. Current vehicles typically employ accelerometers that measure decelerations acting on the vehicle body in the event of a crash. In response to accelerometers, airbags or other safety devices are deployed.

In certain crash situations it would be desirable to provide information before forces actually act upon the vehicle when a collision is unavoidable.

Remote sensing systems using radar, lidar or vision based technologies for adaptive cruise control, collision avoidance and collision warning applications are known. These systems have characteristic requirements for false alarms. Generally, the remote sensing system reliability requirements for pre-crash sensing for automotive safety related systems are more stringent than those for comfort and convenience features, such as, adaptive cruise control. The reliability requirements even for safety related features vary significantly, depending upon the safety countermeasure under consideration. For example, tolerance towards undesirable activations may be higher for activating motorized belt pre-tensioners than for functions such as vehicle suspension height adjustments. Non-reversible safety countermeasures, including airbags, require extremely reliable sensing systems for pre-crash activation. However, the size of objects is typically not taken into consideration in the activation of such countermeasure devices. Also, such systems may generate unintentional or undesirable activations when acting at high speeds, low speeds, or in curve situations. When a vehicle is traveling on a curved road, for example, objects outside of the lane of travel may be determined to be potential crash objects.

It would therefore be desirable to provide a pre-crash sensing system that reduces unintentional or undesirable activations and improves the reliability of object detection and threat assessment. It would also be desirable to provide a system that takes into consideration the size of the object detected.

SUMMARY OF INVENTION

The present invention provides an improved pre-crash sensing system that reduces false activations and activates a countermeasure in response to the size of the object detected.

In one aspect of the invention, a control system for an automotive vehicle has a remote object sensor that generates an object signal in the presence of an object. A vehicle trajectory sensor generates a signal corresponding to the potential presence of a curved road. A vehicle speed sensor generates a speed signal corresponding to the longitudinal speed of the vehicle. A controller is coupled to the remote object sensor, the vehicle trajectory sensor, and the vehicle speed sensor. When the remote object sensor indicates the presence of an object with a minimum cross section in a predefined decision zone, and meeting relative velocity based criteria, and the vehicle speed is above a first minimum threshold and below a second maximum threshold and said road trajectory signal indicates a curved road with the radius of curvature over a pre-selected value, a countermeasure system is activated.

In a further aspect of the invention a method for operating a control system comprises:

establishing a first speed threshold and a second speed threshold;

generating a speed signal corresponding to a vehicle speed; and disabling the countermeasure system when the vehicle speed is below the first threshold or above said second threshold.

One advantage of the invention is that the size and orientation of the sensed object may be taken into consideration. This is extremely useful if the object is another automotive vehicle such as a sport utility, car or truck. By knowing the size of the vehicle, different countermeasures and different countermeasure activation modes may be chosen. Another advantage of the invention is that unintentional or inadvertent activation of countermeasure devices is minimized.

Other advantages and features of the present invention will become apparent when viewed in light of the detailed description of the preferred embodiment when taken in conjunction with the attached drawings and appended claims.

DETAILED DESCRIPTION

Figure 1:
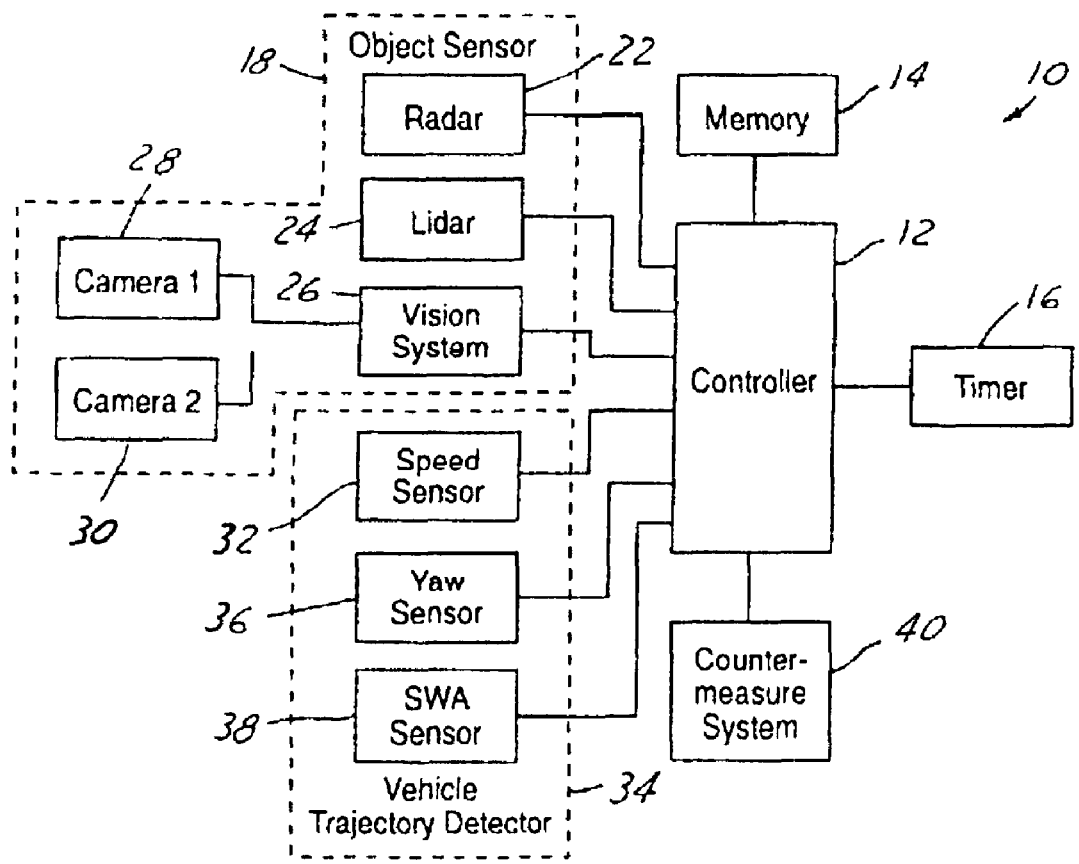
FIG. 1 is a block diagrammatic view of a pre-crash sensing system according to the present invention.

In the following figures the same reference numerals will be used to identify the same components. While the present invention is illustrated with respect to several types of remote object sensors, various types and combinations of remote object sensors may be used as will be further described below.

Referring now to FIG. 1, a pre-crash system 10 has a controller 12. Controller 12 is preferably a microprocessor-based controller that is coupled to a memory 14 and a timer 16. Memory 14 and timer 16 are illustrated as separate components from that of controller 12. However, those skilled in the art will recognize that memory 14 and timer 16 may be incorporated into controller 12.

Memory 14 may comprise various types of memory including read only memory, random access memory, electrically erasable programmable read only memory, and keep alive memory. Memory 14 is used to store various thresholds and parameters as will be further described below.

Timer 16 is a timer such as a clock timer of a central processing unit within controller 12. Timer 16 is capable of timing the duration of various events as well as counting up or counting down.

A remote object sensor 18 is coupled to controller 12. Remote object sensor 18 generates an object signal in the presence of an object within its field of view. Remote sensor 18 may be comprised of one or a number of types of sensors including a radar 22, a lidar 24, and a vision system 26. Vision system 26 may be comprised of one or more cameras, CCD or CMOS type devices. As illustrated, a first camera 28 and a second camera 30 may form vision system 26. Both radar 22 and lidar 24 are capable of sensing the presence and the distance of an object from the vehicle. When used as a stereo pair, cameras 28 and 30 acting together are also capable of detecting the distance of an object from the vehicle. Alternatively, as will be further described below, radar 22 or lidar 24 may be used to detect an object within a detection zone and vision system 26 may be used to confirm the presence of the object within the decision zone and to provide the size of the object to controller 12. In another embodiment of the invention cameras 1 and 2 may use established triangulation techniques to determine the presence of an object and the distance from the vehicle as well as the object's size that may include area, height or width, or combinations thereof.

A vehicle trajectory detector 34 is also coupled to controller 12. The vehicle trajectory detector 34 generates a signal indicative of the vehicle traveling on a curved road. The vehicle trajectory detector 34 may comprise various numbers or combinations of sensors but preferably include vehicle speed sensor 32, a yaw rate sensor 36, and a steering wheel angle sensor 38. A speed sensor 32 is also coupled to controller 12. Speed sensor 32 may be one of a variety of speed sensors known to those skilled in the art. For example, a suitable speed sensor may include a sensor at every wheel that is averaged by controller 12. Preferably, controller translates the wheel speeds into the speed of the vehicle. Suitable type of speed sensors 32 may include, for example, toothed wheel sensors such as those employed on anti-lock brake systems.

Yaw rate sensor 36 preferably provides the yaw rate of the vehicle about the center of gravity of the vehicle. The yaw rate measures the rotational tendency of the vehicle about an axis normal to the surface of the road. Although yaw rate sensor is preferably located at the center of gravity, those skilled in the art will recognize that the yaw rate sensor may be located in various locations of the vehicle and translated back to the center of gravity either through calculations at the yaw rate sensor 36 or through calculations within controller 12 in a known manner.

Steering wheel angle sensor 38 provides a steering wheel angle signal to controller 12. The steering wheel angle signal corresponds to the steering wheel angle of the hand wheel of the automotive vehicle. As will be further set forth below, the yaw rate sensor 36 and the vehicle speed sensor 32 or the steering wheel angle sensor 38 alone, or the above sensors in combination, may be used to indicate a curved road.

Controller 12 is used to control the activation of a countermeasure system 40. Each countermeasure may have an individual actuator associated therewith. In that case, controller 12 may direct the individual countermeasure actuator to activate the countermeasure. Various types of countermeasure systems will be evident to those skilled in the art. Examples of a countermeasure within countermeasure system include occupant belt pre-tensioning, bumper height changing, braking, the pre-arming of internal airbags, the deployment of exterior or internal airbags, pedal control, steering column position, head restraint and knee bolster control. Preferably, controller 12 is programmed to activate the appropriate countermeasure in response to the inputs from the various sensors. As will be described below, the controller may choose the countermeasure and the activation method based on the type and orientation of the target vehicle.

Figure 2:
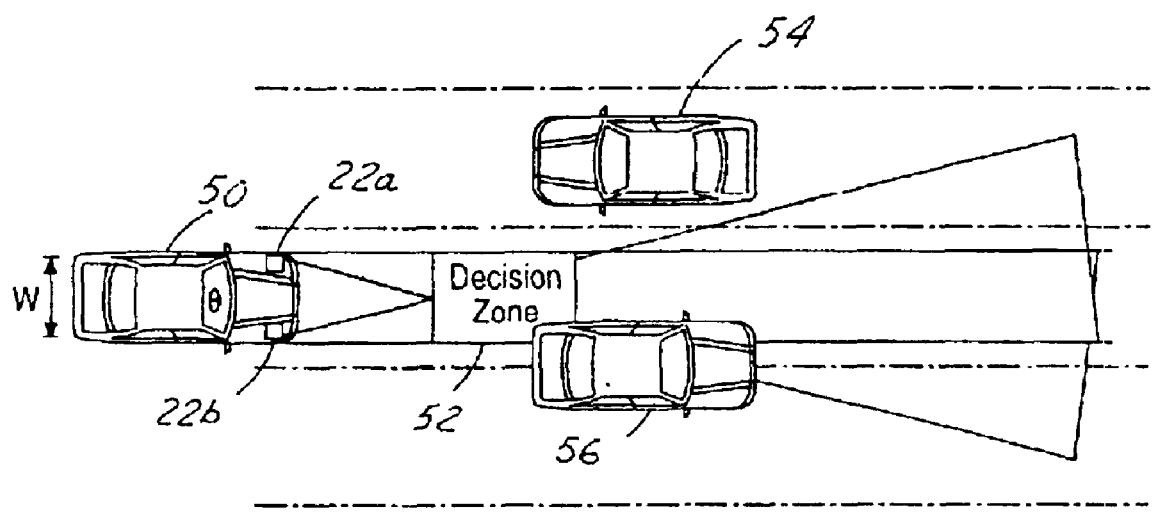
FIG. 2 is a top view of an automotive vehicle with radar part of a pre-crash sensing system that includes two narrow beam radar sensors.

Referring now to FIG. 2, a vehicle 50 is illustrated having a decision zone in front thereof. The width of the decision zone is a predetermined quantity depending upon the width of the host vehicle. The longitudinal dimensions of the danger zone depend upon the relative velocity coverage requirements and the vision system coverage capabilities. An oncoming vehicle 54 is illustrated as well as an ongoing vehicle 56 traveling in the same direction as vehicle 50. As can be seen, a first radar 22a and a second radar 22b are used to direct signals through decision zone 52. When an object enters the decision zone, the radar sensors are able to detect its presence and also obtain its relative velocity with respect to the host vehicle. When the object enters the decision zone the present invention is activated.

Figure 3:
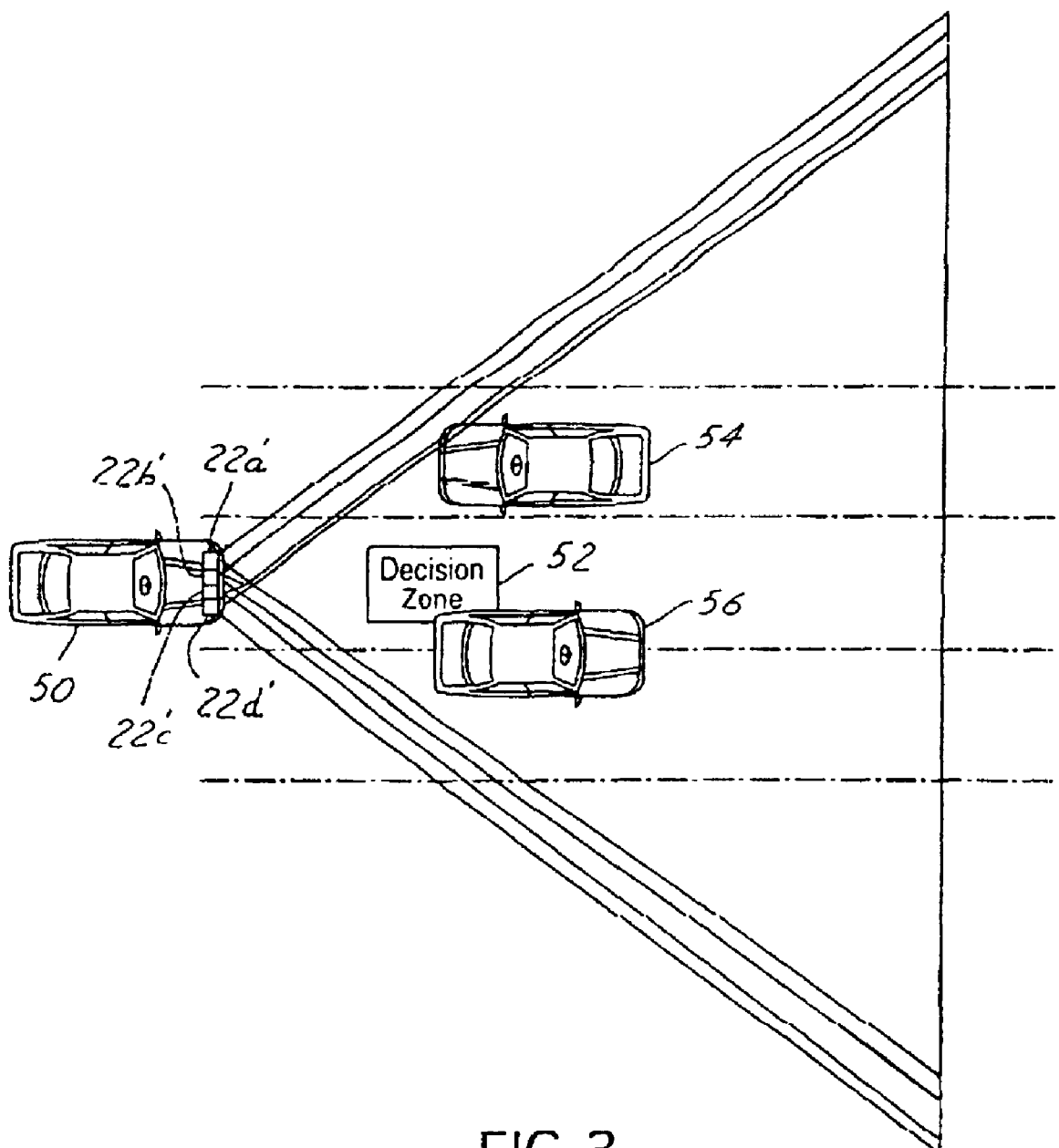
FIG. 3 is a top view of an automotive vehicle with radar part of a pre-crash sensing system according to the present invention that employs four wide beam radar sensors.

Referring now to FIG. 3, a similar view to that shown as in FIG. 2 is illustrated. In this embodiment, four wide beam radar sensors 22a", 22b", 22c", and 22d" are used. With this arrangement, using established triangulation techniques it is possible to obtain distance, bearing, and relative velocity information of objects entering the decision zone. The same size and position of vehicles 54 and 56 are illustrated.

Figure 4:
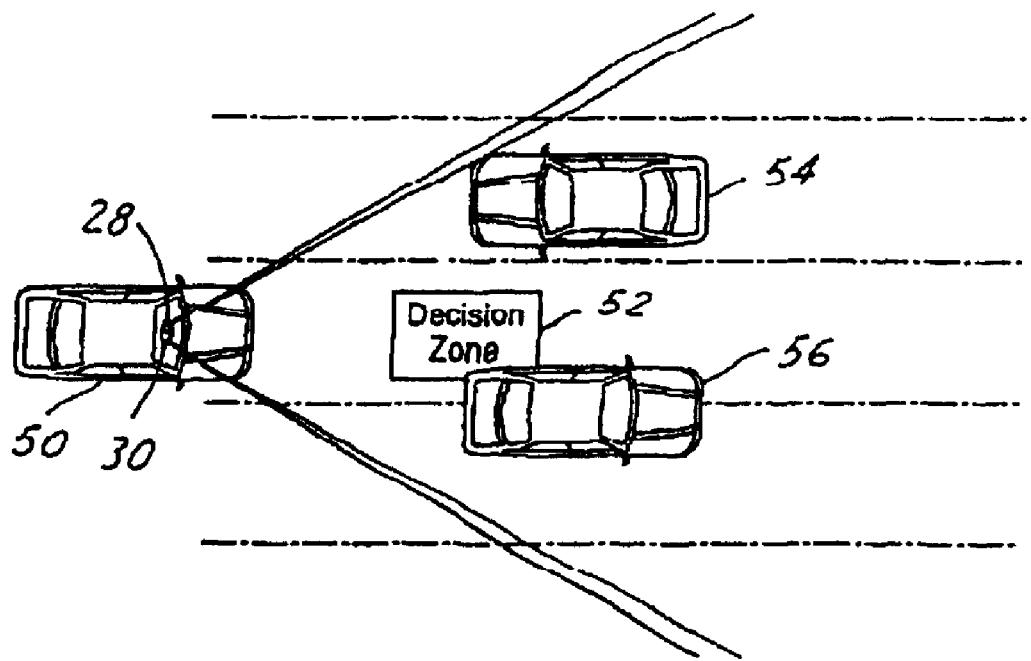
FIG. 4 is a top view of an automotive vehicle having a stereo pair of cameras 28, 30 mounted behind the rear view mirror.

Referring now to FIG. 4, a stereo pair of cameras 28, 30 are used on vehicle 50. The camera system confirms the presence of an object in the decision zone, detected by the radar sensors in FIGS. 2 and 3, and also provides information on the size, distance and orientation of the object. The camera system alone can also be used to detect the presence of an object in the danger zone, obtain its distance, relative velocity, size and orientation information. For pre-crash sensing applications, it is permissible to have both radar and vision based systems to ensure good performance under all weather conditions and also to provide redundancy for improved reliability.

Figure 5:
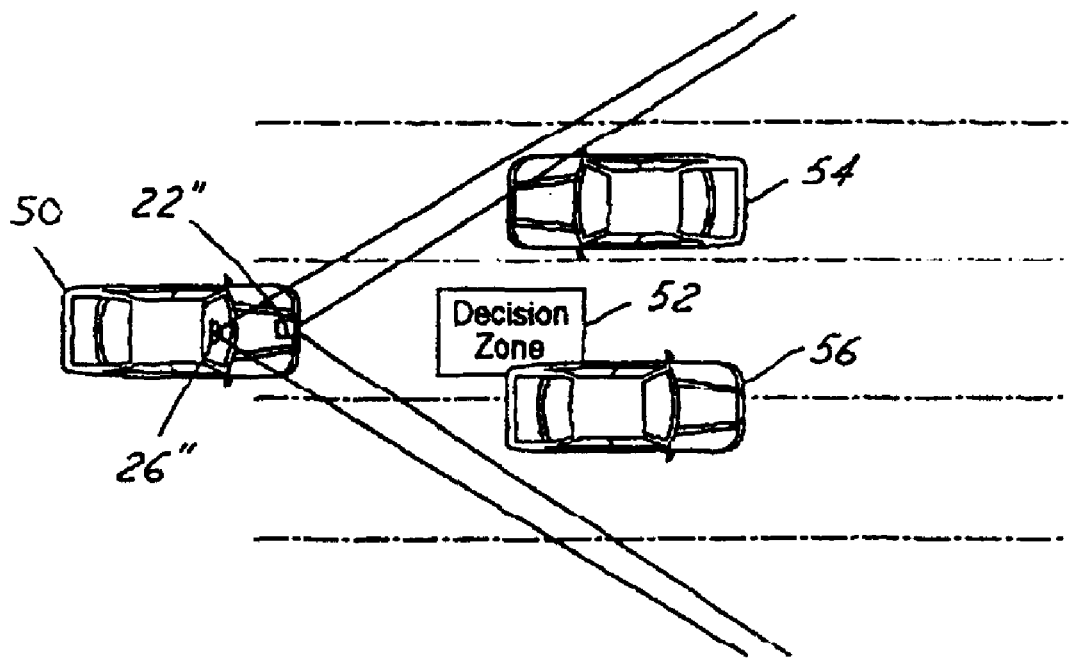
FIG. 5 is a top view of an automotive vehicle having another alternative object sensor 18 including a radar 22"" and vision system 26"".

Referring now to FIG. 5, a vehicle 50 pre-crash sensing system shows a scanning radar or lidar 22"" in combination with a vision system 26"". Again, the radar 22"" can thus detect the presence of an object within the decision zone, while camera 26"" can confirm the presence of the object in the decision zone, classify the object and verify the size and orientation of the object.

Figure 6:
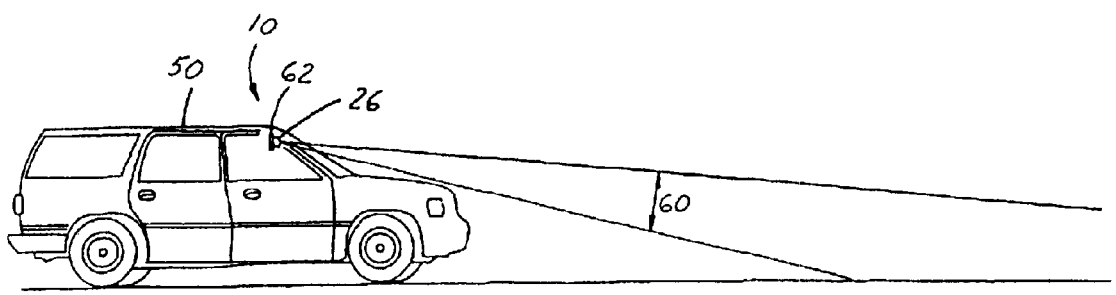
FIG. 6 is a side view of an automotive vehicle indicating the vision sensors line of sight in front of the vehicle.

Referring now to FIG. 6, automotive vehicle 50 is illustrated having a vision system 26 mounted at the back of a rear view mirror 62. A typical line of sight of the vision system, which defines the near side of the vehicle longitudinal decision zone in FIGS. 2 through 5 is shown. Radar sensors are typically mounted in front of the vehicle, behind the front grill or behind the front bumper fascia and have fields of coverage, which are unrestricted by the host vehicle's front end.

Figure 7:
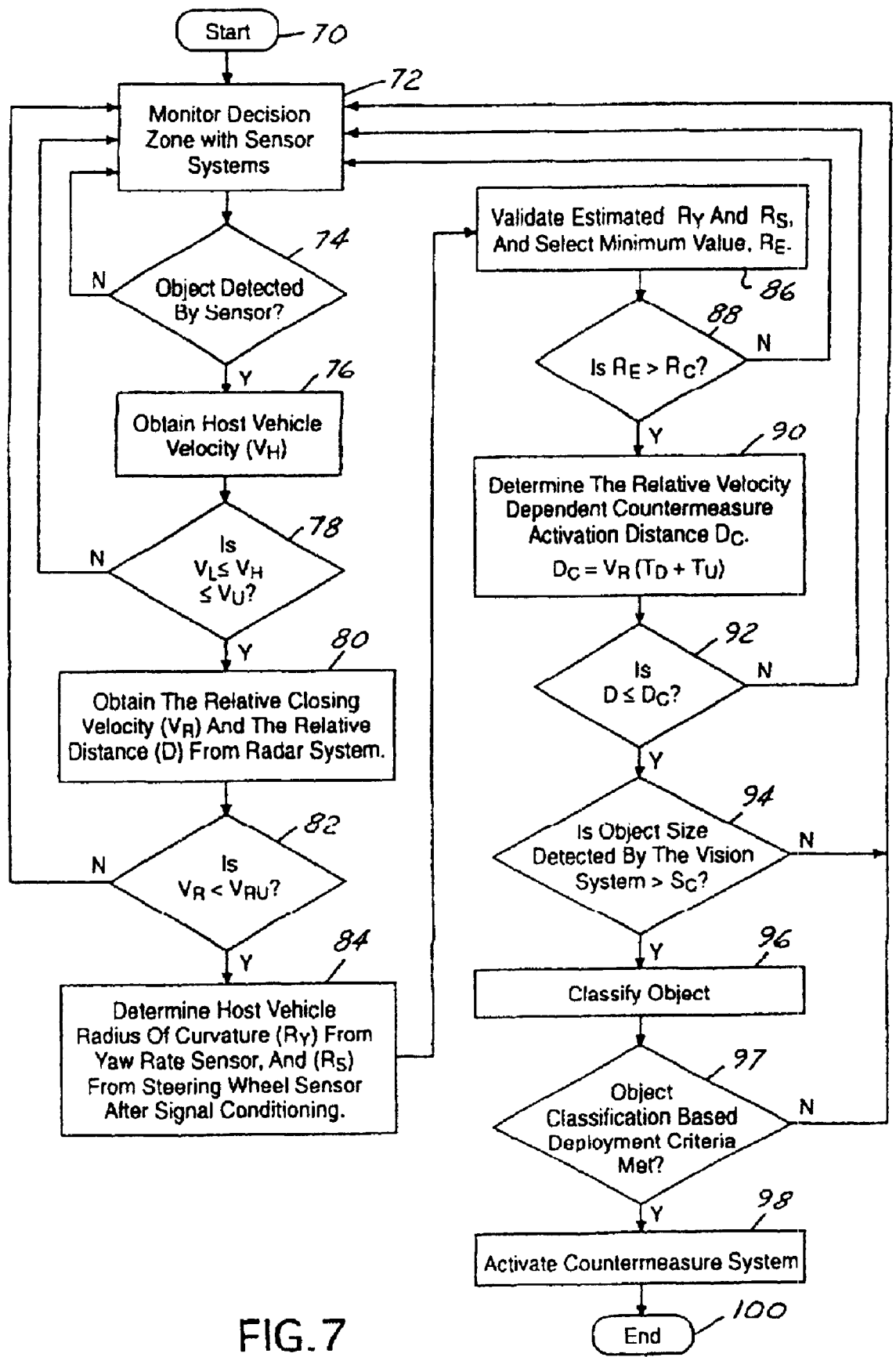
FIG. 7 is a flow chart of a method for operating the pre-crash sensing system according to the present invention.

Referring now to FIG. 7, a method according to the present invention starts at step 70. In step 72, the decision zone in front of the vehicle is monitored with the remote object detector. In the present example, the decision zone is monitored with both radar and vision systems. In step 72 the radar is used to first detect an object within the decision zone. If an object has not been detected in the decision zone, step 72 is again executed. If an object has been detected by radar, step 76 is executed. In step 76, the host vehicle velocity ($V_H$) is determined. In this example the host vehicle is vehicle 50 described above. In step 78, a low speed threshold value $V_L$ and a high speed threshold value $V_U$ are established. In step 78 the host vehicle velocity (i.e., speed) ($V_H$) is compared with a first threshold ($V_L$) and a second threshold ($V_U$). The first threshold is a low speed threshold and the second threshold is a high speed threshold. In the present example, the low speed threshold is set at 24 kph and the high speed threshold is set at 80 kph. Thus, if the host vehicle speed is less than the low speed threshold or greater than or equal to the high speed threshold, step 72 is again executed. If the host vehicle speed is between the low speed threshold and the high speed threshold, then step 80 is executed. Step 78 helps minimize inadvertent, unintentional, and non-useful deployments during real world driving situations.

In step 80 the relative velocity ($V_R$) and the distance D from the radar system are determined for the closing object. In step 82 a relative velocity threshold value $V_{RU}$ is established. In step 82, if the closing relative velocity ($V_R$) is not less than a upper threshold $V_{RU}$, then step 72 is again executed. In step 82 if the closing velocity ($V_R$) is less than $V_{RU}$, step 84 determines the host vehicle trajectory radius of curvature ($R_Y$) from the yaw rate sensor, vehicle speed sensor, and the host vehicle trajectory radius of curvature ($R_S$) from the steering wheel sensor after appropriate signal conditioning as will be evident to those skilled in the art. In step 86, the radii of curvature from the yaw rate ($R_Y$) and from the steering wheel sensor ($R_S$) are validated to ensure that they are within a proper range and are not erroneous readings. One method for validation is to compare previous values for the radius of curvature to determine if a value has changed at a rate greater than that physically achievable by the automotive vehicle. A minimum value is selected between the radius of curvature from the yaw rate and from the steering wheel sensor. This minimum value is the estimated radius of curvature ($R_E$).

In step 88, a radius of curvature threshold value ($R_C$) is established. The estimated radius of curvature ($R_E$) is compared with the threshold. If the estimated value is not greater than the threshold then step 72 is again executed. If the estimated radius of curvature value ($R_E$) is greater than the radius of curvature threshold, then step 90 is executed. Step 88 prevents the system from operating when the vehicle is traveling on a very curved trajectory to prevent an unintentional deployment.

In step 90, the relative velocity dependent countermeasure activation distance ($D_C$) is determined as a function of the closing relative velocity, a device deployment time dependent variable ($T_D$), and an update rate ($T_U$) of the sensing system. That is, $D_C = V_R(T_D + T_U)$. In step 92, if the relative distance D from the radar system is not less than or equal to the countermeasure activation distance ($D_C$) step 72 is again executed. If the relative distance D is less than or equal to countermeasure activation distance ($D_C$), step 94 is executed. In step 94 object size threshold ($S_C$) is established. In step 94 the object size is compared with an object size threshold ($S_C$). If the object size is not greater than the size threshold ($S_C$), then step 72 is executed. If the object size is greater than the threshold, step 96 is executed. In step 94 object size may correspond to various characteristics of the object. For example, the object height may be determined. The object width may also be determined. By knowing both the object width and object height, the object area may also be determined. When viewing object height, the difference between a small sports car, a full size sedan, a sport utility or light truck, and a heavy duty truck may be distinguished.

In step 96, the object may be classified. The object may be classified into various classes depending on the object size and other characteristics as set forth in step 94. Also, the size of the object may be classified for orientation. The orientation may ultimately lead to a different decision as to which of the countermeasures may be activated and may also define the mode of activation of the selected countermeasures. By looking at the object area or the object height and width as a function of time, a front view of a sport utility vehicle or car may be distinguished from the side view.

In step 97, object size and orientation information is compared to object classification based deployment criteria for the elements of the countermeasure system. If the classification based deployment criteria are not satisfied then step 72 is again executed.

In step 98, when the classification based activation criteria are met, appropriate elements of the countermeasure system are activated in response to the various inputs described above. In step 100, the method ends after activation.

While particular embodiments of the invention have been shown and described, numerous variations and alternate embodiments will occur to those skilled in the art. Accordingly, it is intended that the invention be limited only in terms of the appended claims.

What is claimed is:

1. A method for operating a pre-crash sensing system having a countermeasure system comprising:
   establishing a first speed threshold and a second speed threshold;
   generating a speed signal corresponding to a vehicle speed; disabling the countermeasure system when the vehicle speed is below the first threshold; and
   disabling the countermeasure system when the vehicle speed is above said second threshold.

2. A method as recited in claim 1 further comprising generating a vehicle trajectory signal having a curved road indication; and wherein disabling comprises disabling the countermeasure system when the vehicle speed is below the first threshold, above said second threshold or in response to said curved road indication.

3. A method as recited in claim 2 further comprising detecting a vehicle yaw rate signal and vehicle speed signal; and wherein the curved road indication is a function of said vehicle yaw rate signal and vehicle speed signal.

4. A method as recited in claim 2 further comprising detecting a steering wheel angle signal; and wherein the curved road indication is a function of said steering wheel angle signal.

5. A method as recited in claim 2 further comprising detecting a vehicle yaw rate signal and vehicle speed signal;

detecting a steering wheel angle signal; and wherein the curved road indication is a function of said vehicle yaw rate signal, vehicle speed signal and steering wheel angle signal.

6. A method as recited in claim 1 further comprising establishing a decision zone in front of the vehicle.

7. A method as recited in claim 6 wherein establishing a decision zone in front of the vehicle comprises establishing a decision zone in front of the vehicle as a function of the first longitudinal threshold and the second longitudinal threshold.

8. A method as recited in claim 6 wherein establishing a decision zone in front of the vehicle comprises establishing a decision zone in front of the vehicle as a function of the first longitudinal threshold, the second longitudinal threshold and a lateral threshold which is a function of vehicle width.

9. A method as recited in claim 6 further comprising detecting an object within the decision zone; and activating a countermeasure in response to detecting the presence of an object in the decision zone.

10. A method as recited in claim 9 wherein activating the countermeasure comprises pre-arming or deploying airbags, pre-tensioning a motorized belt pre-tensioner, and selectively changing a bumper height by activating a bumper height adjustment means in response to vehicle classification information.

11. A control system for an automotive vehicle having a vehicle body and a countermeasure system, said system comprising:
    a remote object sensor generating an object signal in the presence of an object;
    a vehicle trajectory sensor generating a signal indicative of the presence of a curved road;
    a vehicle speed sensor generating a speed signal corresponding to the longitudinal speed of the vehicle body; and
    a controller coupled to remote object sensor, said vehicle trajectory sensor and said vehicle speed sensor, when said remote object sensor indicates the presence of an object with a minimum cross section in a predefined decision zone meeting pre-defined relative velocity criteria, and said vehicle speed is above a first threshold and below a second threshold, and said vehicle trajectory sensor indicates a curved road with a radius of curvature above a threshold value, activating a countermeasure system.

12. A control system as recited in claim 11 wherein said vehicle trajectory sensor comprises a yaw rate sensor generating a yaw motion signal corresponding to a yaw motion of the vehicle body and a vehicle speed sensor.

13. A control system as recited in claim 11 wherein said vehicle trajectory sensor comprises a steering wheel angle sensor generating a steering wheel angle signal corresponding to a steering wheel angle position.

14. A control system as recited in claim 11 wherein said remote object sensor is selected from the group consisting of radar, lidar and vision systems.

15. A method for operating a pre-crash sensing system for an automotive vehicle having a countermeasure system comprising:
    establishing a decision zone relative to the vehicle;
    detecting an object within the decision zone;
    establishing a first speed threshold and a second speed threshold;
    generating a vehicle speed signal corresponding to a vehicle speed;
    disabling the countermeasure system when the vehicle speed signal is below the first threshold or above said second threshold;
    generating an object relative velocity signal corresponding to an object relative velocity within the decision zone;
    disabling the countermeasure system when the object relative velocity signal is greater than a pre-established threshold;
    generating a vehicle trajectory signal corresponding to a radius of curvature of the vehicle trajectory;
    establishing a curved road signal threshold;
    disabling the countermeasure system when the vehicle trajectory signal is less than the pre-defined curved road signal threshold; and
    activating the countermeasure system in response to the controller actuation signal.

16. A method as recited in claim 15 further comprising determining countermeasure activation distance as a function of closing velocity; determining an object distance; and, disabling the countermeasure system when the object distance is greater than the countermeasure activation distance.

17. A method as recited in claim 16 further comprising determining an object cross-sectional area; establishing a object cross-sectional area minimum threshold; and, disabling the countermeasure system when the object cross-sectional area is less than the threshold value.

18. A method as recited in claim 17 wherein determining an object cross-sectional area comprises determining the object cross-sectional area with a vision system.

19. A method as recited in claim 17 wherein determining an object cross-sectional area comprises determining the object cross-sectional area with a scanning radar or lidar system.

20. A method as recited in claim 15 wherein generating a vehicle trajectory signal comprises generating a first radius of curvature signal from a yaw sensor and vehicle speed sensor; generating a second radius of curvature signal from a steering wheel angle sensor; establishing the vehicle trajectory signal as the lower of the first radius of curvature or the second radius of curvature signals.

* * * * *